UNITED STATES PATENT OFFICE.

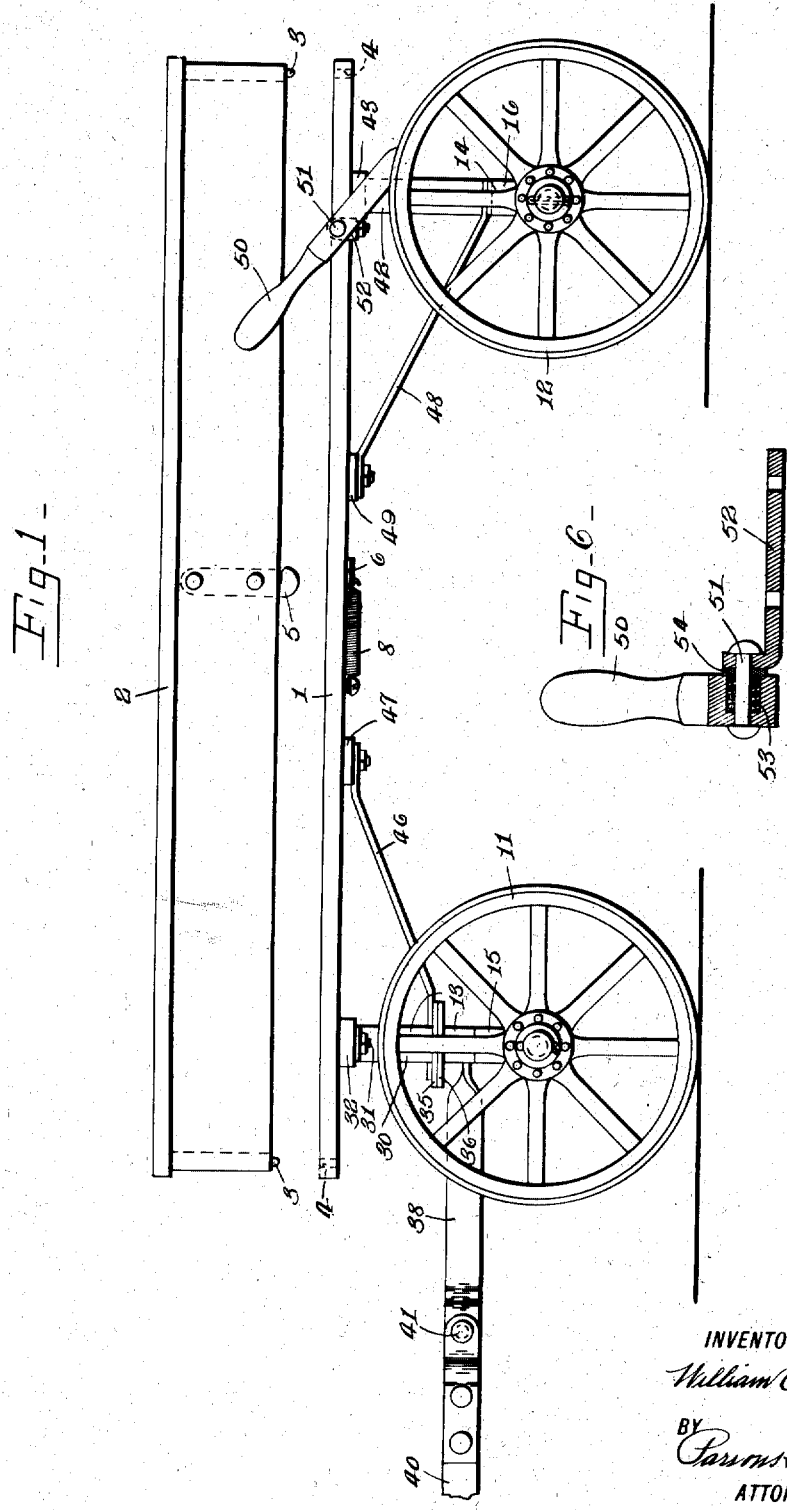

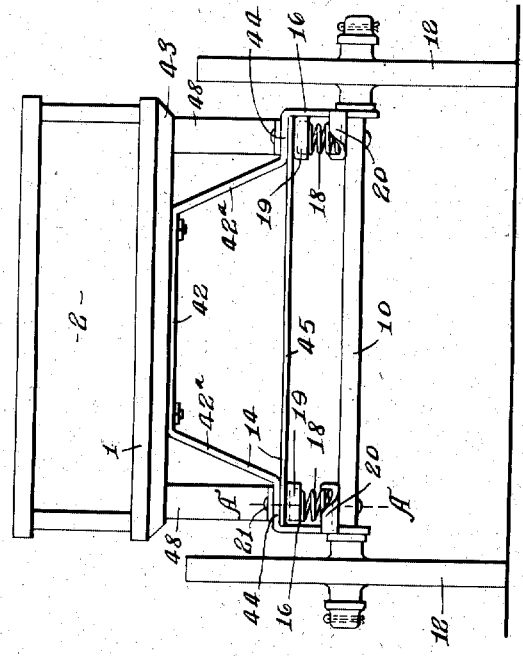

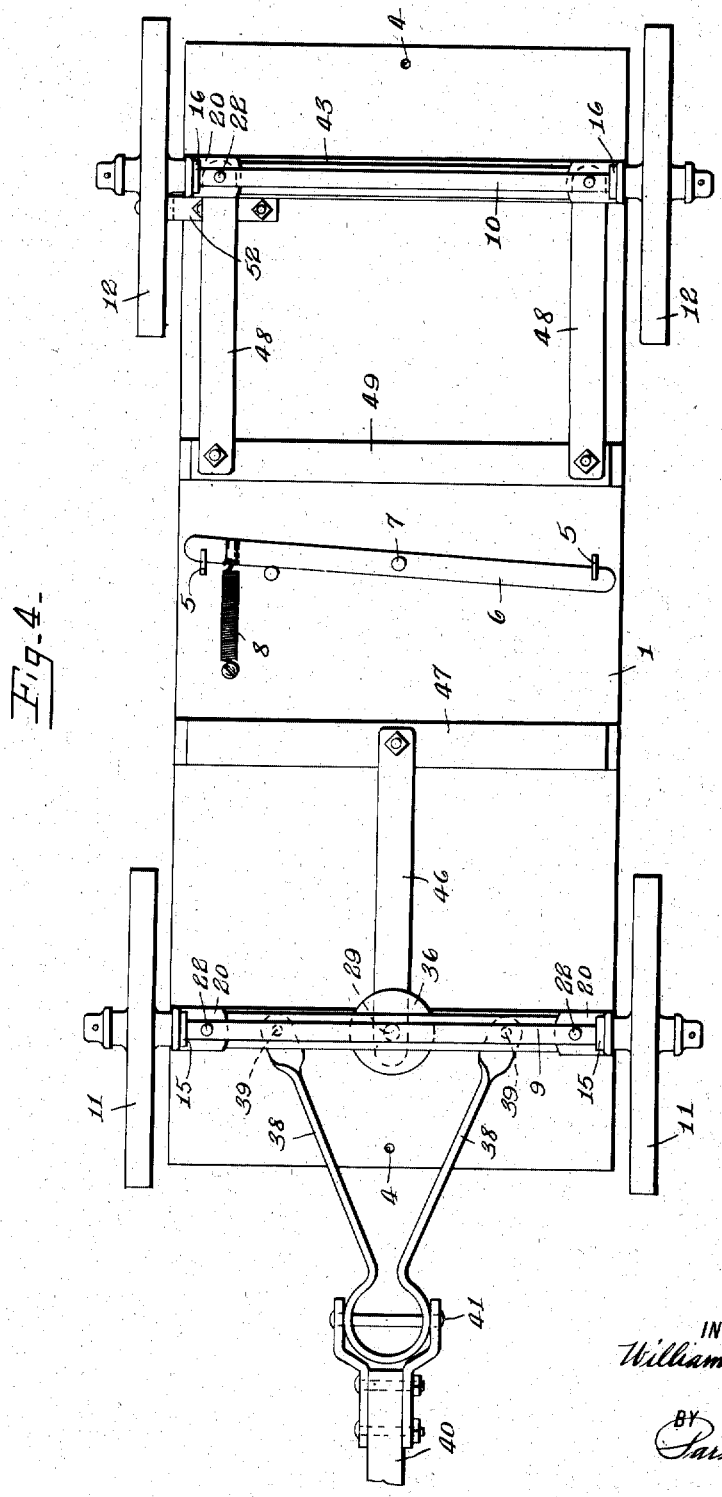

WILLIAM E. SHERWOOD, OF CANASTOTA, NEW YORK.

CART OR WAGON.

1,282,472.  Specification of Letters Patent.  Patented Oct. 22, 1918.

Application filed January 19, 1916. Serial No. 73,016.

*To all whom it may concern:*

Be it known that I, WILLIAM E. SHERWOOD, a citizen of the United States, and a resident of Canastota, in the county of Madison and State of New York, have invented a certain new and useful Cart or Wagon, of which the following is a specification.

This invention relates generally to wagons, and has for its object the production of a child's cart especially adapted for coasting, and other hard usages, which cart is particularly simple and strong in construction and highly efficient and durable in use, and one object especially is a construction by which springs are applied to such carts without liability of being broken; and the invention consists in the novel combinations and constructions hereinafter set forth and claimed.

In describing this invention, reference is had to the accompanying drawings, in which like characters designate corresponding parts in all the views.

Figure 1 is a side elevation of a cart embodying my invention, the box being shown as displaced upwardly away from the platform.

Figs. 2 and 3 are, respectively, front and rear elevations of my wagon, Fig. 2 being partly in section.

Fig. 4 is a bottom plan view thereof.

Fig. 5 is an enlarged sectional view on line A—A, Fig. 3, showing a construction common to both the front and rear bolsters and contiguous parts.

Fig. 6 is an enlarged detail view of the brake of this wagon.

This wagon comprises generally, a body and running gear supporting the body.

The body, includes a platform 1 and a box 2 mounted on the platform and removable therefrom, the box being here shown as formed with pins or dowels 3 which fit into complemental openings 4 on the platform 1.

The platform 1 and box 2 are also provided with a particularly simple means for locking the same, this means being here shown as comprising keepers 5 provided on the sides of the box 2 midway between the ends thereof and projecting below the lower edge of the box and through slots in the platform 1, and a latch 6 located on the under side of the platform and movable into and out of engagement with the keepers 5. The lower ends of the keepers 5 are here shown as hook shaped, and the latch 6 is usually a lever pivoted at 7 between its ends and having its opposite end portions movable in opposite directions into and out of engagement with the hook-shaped lower ends of the keepers, these hook-shaped lower ends facing in opposite directions. The latch 6 is normally moved into its operative position by a coiled spring 8 connected at one end to the lever and at its other end to the platform 1.

The running gear includes front and rear axles, 9, 10 having the wheels 11 and 12 mounted thereon, bolsters between the axles and the platform 1, springs interposed between the bolsters and the axles and front and rear braces connecting the bolsters and the platform 1.

13 designates the front bolster and 14 the rear bolster, these bolsters being formed with down turned ends 15 and 16 respectively at their opposite ends and with horizontal portions at the upper ends of the vertical portions 15, 16, each vertical portion 15 or 16 being formed with a vertical slot 17 through which the axle 9 or 10 passes. Suitable springs 18 are interposed between the horizontal portions of the bolsters adjacent the vertical portions 15, 16, and the axle.

As here shown the springs 18 are coiled compression springs which are seated at their opposite ends in seats or sockets 19, 20 provided on the bolsters and the axles and secured thereto by suitable fastening members as bolts or rivets 21, 22. The slots 17 constitute means for holding the axles from forward and rearward displacement and for guiding the axles and bolsters during relative vertical movement, and the upper and lower end walls of the slots constitute stops for limiting such relative vertical movement so that the springs will not become dislodged or crushed. The sockets 19 and 20 may, however, be provided with sides deep enough to prevent undue crushing of the springs.

The front bolster 13 is composed of lower and upper sections which are associated respectively with the front axle and the body of the cart and are connected together by a king bolt and fifth wheel. The lower section 23 is formed of metal straps, one of which includes an intermediate portion 24 with the down turned ends 15 and a horizontal portion 25 adjacent said downturned ends. The lower section also includes a strap 26, the intermediate part of which is spaced apart from the strap 24, and the end portions 27 of which are lapped under the horizontal portions 25, and are secured thereto by the rivet or bolt 21 which secures the spring socket sections 19 to the bolster section 23, the ends 27 being interposed between the spring seats or sockets 19 and the horizontal portions 25 of the upper strap 24. The straps 24, 26 are provided with openings for the king bolt, and a sleeve 28 is interposed between the spaced apart portions of these straps in alinement with an opening for the king bolt 29.

The upper section 30 of the front bolster, is a sheet metal strap connected at its ends by bolts 31 to the wagon body, or to a strip 32 extending transversely of the wagon body, this strap 30 having its intermediate portion offset from the body, the offset portion comprising downwardly converging sides, and a horizontal central piece 33 connecting the ends of the converging sides and formed with an opening for the king bolt 29. A sleeve 34 is interposed between the horizontal piece 33 and the strip 32 in alinement with the king bolt opening. Fifth wheel sections 35 and 36 are mounted respectively on the upper and lower sections of the front bolster concentric with the king bolt 29 and are secured to said sections in any suitable manner as by bolts or rivets. The central horizontal piece 33 is formed with an upwardly projecting boss 37 through which the king bolt passes, the boss providing a recess on the under side of the central piece 33 in which the front end of the brace, to be described extends. Forwardly extending tongue straps 38 are connected at 39 to the lower section of the front bolster and a tongue or handle 40 is pivoted at 41 to the front ends of the straps.

The rear bolster 14 comprises a sheet metal strap including an intermediate portion 42 secured to the platform 1, or a transverse strip 43 on the under side thereof, and having downwardly extending legs 42ª terminating in laterally extending horizontal portions 44 from the outer ends of which extend the vertical slotted portions 16, previously referred to. The rear bolster also includes a bar or strap 45 extending above the rear axle but, substantially parallel thereto and connected at its ends to the horizontal portions 44 of the strap 42. The spring seats 19 and 20 for the rear springs are interposed between the ends of this bar or strap 45 and the opposing parts of the rear axle and the fastening members 21 which secure these spring seats in position, also secure the bar 45 at its ends to the horizontal part of the strap 42.

46 is the front brace, the front end of which extends through the recess formed by the raised portion 37 of the upper section of the front bolster, and the rear end of which is secured to a strip 47 on the under side of the platform 1. 48 are the rear braces connected at their rear ends to the horizontal parts 44 of the rear bolster, by the fastening members 21 which secure the rear spring seats 19 in position. These braces 48 are secured at their front ends to a strip 49 secured to the under side of the platform 1.

50 designates a brake lever pivotally mounted on a stud 51 extending laterally from a bracket iron 52 secured to the under side of the platform 1 above one rear wheel 12, and this lever is provided with friction means for holding it at any pivotal angle. This friction means consists of a coiled spring 53 located in an axial socket extending inwardly from the inner side of the lever and counterbored with respect to the axial bore or pivotal opening of said lever, the spring 53 pressing in opposite directions against the bottom of this counter bore and against a washer 54 interposed between the lever and the bracket iron.

Owing to the construction of the brake lever it will stay in any pivotal position, and hence cannot fall down out of reach or become displaced, and is always in such position that it can be easily grabbed when necessary.

The running gear construction is particularly simple and strong and provides a simple way of applying springs to this class of carts which springs will withstand the hard usage to which these carts are subjected.

What I claim is:

1. A wagon having an axle, a bolster above the axle, one of said parts having vertically extending straps formed with slots through which the other part extends and springs interposed between the bolster and the axle adjacent said straps, substantially as and for the purpose described.

2. A wagon comprising an axle, a bolster located above the axle and including a metal strap having vertical portions at its opposite ends, said vertical portions being formed with vertical slots through which the axle passes, and springs located adjacent said vertical portions and interposed between the axle and the bolster, substantially as and for the purpose specified.

3. A wagon having an axle, a bolster above the axle, including a metal strap having vertical portions at its ends and substantially horizontal portions extending inwardly adjacent the vertical portions, the vertical portions being formed with slots through which the axle passes, spring seats on the horizontal portions of the bolster and on the opposing portions of the axle, and coiled springs having their ends in said seats, substantially as and for the purpose set forth.

4. A wagon comprising a body, and running gear comprising front and rear axles, bolsters above the axles including vertical portions located at the opposite ends of the bolsters, and formed with vertical slots through which the axles pass, springs interposed between the said horizontal portions of the bolsters and the opposing ends of the axles, and braces connecting the bolsters and the body of the wagon, substantially as and for the purpose set forth.

5. A wagon comprising a body, an axle, a bolster above the axle including vertical portions located at opposite ends of the bolster and formed with vertical slots through which the axle passes and inwardly extending horizontal portions at the upper ends of the vertical portions, springs interposed between the horizontal portions and the axles, and braces connected to the body and to the horizontal portions of the bolsters, substantially as and for the purpose described.

6. A wagon comprising a body, an axle, and a bolster including two sections, one section being associated with the body and the other with the axle, a king bolt connecting the sections, the lower section being formed of sheet metal straps having their end portions lying one on the other and the intermediate portions spaced apart and formed with openings through which the king bolt passes, and a sleeve located between the intermediate portions, in alinement with said king bolt openings, and the upper section including a strap connected at its opposite ends to the body and having its intermediate portion spaced apart from the wagon body and including a central horizontal portion opposed to the lower section of the bolster, and formed with an opening for the king bolt, and a sleeve interposed betwen the body and the horizontal portion of the upper section in alinement with the king bolt opening, substantially as and for the purpose set forth.

7. A wagon comprising a body, an axle, a bolster including two sections, a king bolt passing through the sections, one section being associated with the body and the other with the axle, the upper section comprising a metal strap connected at its opposite ends to the body and having its intermediate portion offset from the body and including a central horizontal part opposed to the lower section of the bolster, and formed with an opening for the king bolt, and a sleeve interposed between the body, and the central part of said upper section in alinement with the king bolt opening, substantially as and for the purpose described.

8. A wagon comprising a body, an axle, a bolster including two sections, one being associated with the body and the other with the axle, the upper section comprising a metal strap connected at its opposite ends to the body and having its intermediate portion offset from the body and including a central horizontal part opposed to the lower section of the bolster, and formed with an opening for the king bolt and a sleeve interposed between the body and the central part of said upper section and in alinement with the king bolt opening, said central part having a raised boss forming a recess through which the king bolt passes, and a brace having one end seated in said recess and formed with a hole in alinement with a king bolt opening, substantially as and for the purpose specified.

9. A wagon comprising an axle, a bolster above the axle comprising a strap having an offset intermediate portion and horizontally extending portions located at opposite ends which are formed with slots for receiving the axle, said section also including a second strap opposed to the offset intermediate portion of the first strap and being spaced apart therefrom and having its ends secured to the horizontal portions of the first strap adjacent the vertical portions thereof, spring seats provided on said horizontal portions and on the opposing portions of the axle, and coiled springs interposed between said seats, substantially as and for the purpose described.

10. A wagon comprising a rear axle, a bolster above the rear axle, having vertically extending portions formed with slots through which the rear axle passes, inwardly extending horizontal portions at the upper ends of the vertical portions and an upwardly extending offset portion projecting above the horizontal portions and being secured to the wagon body, and a bar extending substantially parallel to the axle and above the same and connected at its ends to the horizontal portions of the bolster, and springs interposed between said horizontal portions of the bolster and the opposing ends of the axle, substantially as and for the purpose specified.

11. A wagon comprising a rear axle, a bolster above the rear axle having vertically extending portions formed with slots through which the rear axle passes, inwardly extending horizontal portions at the upper ends of the vertical portions, an upwardly extending offset portion projecting above the horizontal portions and being secured to the wagon body, and a bar extending substantially parallel to the axle and above the same and connected at its ends to the horizontal portions of the bolster, springs interposed between said horizontal portions of the bolster and the opposing ends of the axle, and braces secured to said horizontal portions of the bolster and to the wagon body, substantially as and for the purpose set forth.

In testimony whereof I have hereunto signed my name, at Syracuse, in the county of Onondaga and State of New York, this 20th day of October, 1915.

WILLIAM E. SHERWOOD.